Figure 1:
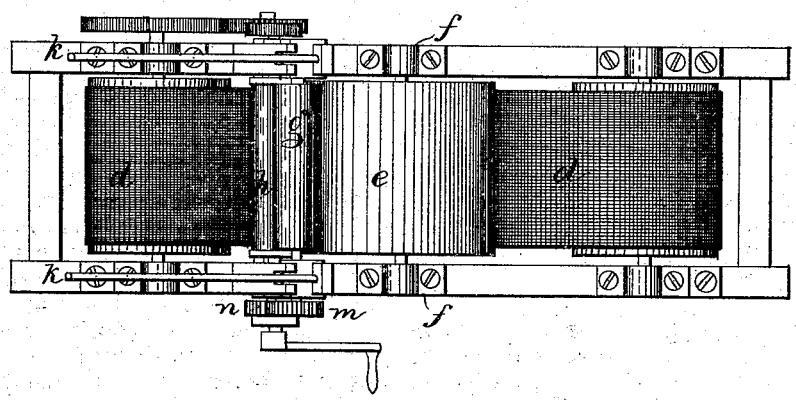

T. H. DUNHAM.

Machinery for the Manufacture of Oakum.

No. 154,464. Patented Aug. 25, 1874.

Witnesses.
M. W. Frothingham.
L. H. Latimer.

Inventor.
Thomas H. Dunham.
per Crosby & Gould.
Attys

UNITED STATES PATENT OFFICE.

THOMAS H. DUNHAM, OF BOSTON, MASSACHUSETTS.

IMPROVEMENT IN MACHINERY FOR THE MANUFACTURE OF OAKUM.

Specification forming part of Letters Patent No. 154,464, dated August 25, 1874; application filed June 19, 1874.

*To all whom it may concern:*

Be it known that I, THOMAS H. DUNHAM, of Boston, in the county of Suffolk and State of Massachusetts, have invented an Improved Machine for Tarring Calking Material; and I do hereby declare that the following, taken in connection with the drawings which accompany and form part of this specification, is a description of my invention sufficient to enable those skilled in the art to practice it.

United States Letters Patent No. 146,438 have been granted to me for an improvement in the manufacture of oakum or calking material; and my present invention relates to means for feeding the staple material into and from the tar-vat, and for expressing the excess of tar therefrom. For this purpose I use, in connection with a vat in which the tar is heated, (or containing hot tar,) an endless apron made of wire-cloth, and running around two drums at opposite ends of the vat, between which drums is a guide-cylinder, extending down into the vat, and having the apron passing beneath it. The apron receives the loose flakes of material, having in themselves no connection that would insure their continuous passage through the tar, and, as the apron moves, (by rotation imparted to one of the drums,) it carries upon it the flakes, passing them continuously under the guide-cylinder, from under which, as they emerge, they pass between two presser-rolls placed above the vat, such rolls expressing the redundant tar, and the upper one having means for creating pressure upon it to squeeze the material between the rolls. The presser-rolls are made of canvas or duck wound upon suitable shafts or mandrels, such rolls affording the requisite elasticity and flexibility. My invention consists primarily in the combination of the wire apron, the guide-roll, and the presser-rolls with the vat.

The drawing represents a construction embodying the invention.

Figure 2:
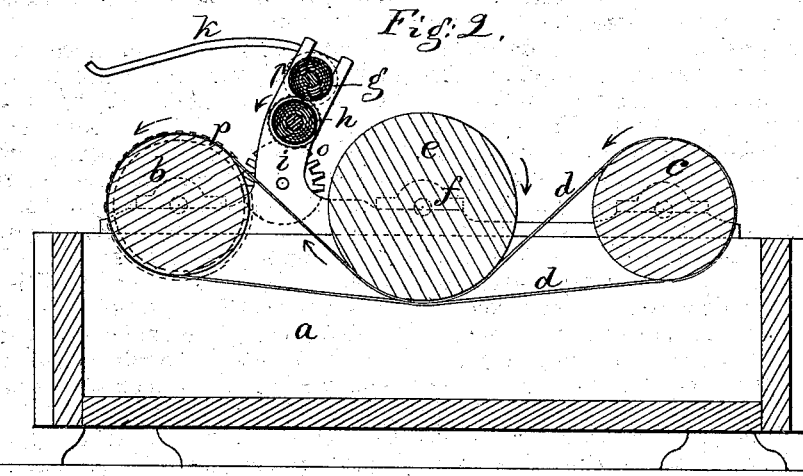

Figure 1 shows the machine in plan. Fig. 2 is a sectional elevation of it.

$a$ denotes the tar-containing tank, made with any suitable provision for heating the tar. $b\ c$ denote the two drums, the shafts or gudgeons of which are journaled in suitable stationary bearings at opposite ends of the tank. $d$ denotes the apron, formed of wire-cloth, for ready passage of the liquid tar. Over this apron is a loose cylinder, $e$, having journals turning in stationary bearings $f$, the upper portion of the apron passing under this cylinder, and being in contact therewith, and the cylinder guiding the apron down into the liquid contents of the vat.

The drums and cylinder and presser-rolls all rotate in the direction of the respective arrows thereon, and the hemp, in separate flakes, being placed upon the apron between the roll $c$ and cylinder $e$, is carried down by the apron under the cylinder into the tar, and thence up at the other side of the cylinder to the presser and expressing-rolls $g\ h$, the flakes being caused to adhere by the tar.

The rolls $g\ h$ are journaled in bearings in uprights $i$, and the bearings of the upper roll, $g$, are movable, and are provided with levers $k$, by means of which, and either by hand-pressure or by weights, the upper roll can be pressed hard against the roll $h$.

As the material emerges from the vat, it passes between the presser-rolls, and, by their pressure all excess of tar is removed, leaving the material in condition for rapid drying, as set forth in my said patent.

Each roll $g\ h$ is made by winding a long strip of canvas or duck around the shaft or mandrel $l$ of said roll, and securing the outer end by stitches or other suitable fastenings, the roll so built up having an elasticity and pliability necessary for the requisite pressure upon all parts of the varyingly thick material passing through the rolls to remove the redundant tar therefrom.

The rolls $g\ h$ are shown as geared together by gears $m\ n$, and the roll $h$ to the apron-drum $b$ by gears $o\ p$, simultaneous movement being thereby imparted to the rolls, drum, and apron, and the cylinder $e$ turning by frictional contact of the apron or the material fed by the same.

I claim—

1. In combination with the vat for containing the hot tar, the drums $b$ $c$, wire-cloth apron $d$, guide-cylinder $e$, and expressing and delivering rolls $g$ $h$, combined and arranged to operate substantially as described.

2. The expressing-rolls $g$ $h$, formed of mandrels wound with duck, canvas, or other flexible material, in combination with the apron, guide-cylinder, and vat, substantially as described.

THOMAS H. DUNHAM.

Witnesses:
FRANCIS GOULD,
M. W. FROTHINGHAM.